Jan. 27, 1959   J. J. BERNAD ET AL   2,870,925
APPARATUS FOR STOCKING SMALL LOGS AND PICKING UP
SAME FROM A STOCK FOR LOADING VEHICLES
Filed March 6, 1957   5 Sheets-Sheet 1

Jan. 27, 1959   J. J. BERNAD ET AL   2,870,925
APPARATUS FOR STOCKING SMALL LOGS AND PICKING UP
SAME FROM A STOCK FOR LOADING VEHICLES
Filed March 6, 1957   5 Sheets-Sheet 3

2,870,925
United States Patent Office                 Patented Jan. 27, 1959

2,870,925

APPARATUS FOR STOCKING SMALL LOGS AND PICKING UP SAME FROM A STOCK FOR LOADING VEHICLES

Jacques Joachim Bernad, Auby, Armand Novion, Rieulay par Marchiennes, and Michel Jean Lablache-Combier, Neuves-Maisons, France, assignors to Société Anonyme dite: Societe Auxiliaire de l'Entreprise "Auxen", Paris, France Application March 6, 1957, Serial No. 644,234

Claims priority, application France March 15, 1956

8 Claims. (Cl. 214—147)

This invention relates to material handling apparatus and has specific reference to an apparatus designed for handling small, round-sectioned logs, particularly mine timber, for either stocking small logs, or picking up same from a stock.

The operations to be effected may comprise the transfer of logs from a stock to a transport vehicle, notably a railway car, or the unloading of the transport vehicle to form a stock.

It is a further object of this invention to provide a self-propelled vehicle adapted, from a given working position, to grab logs stacked parallel to one another in any direction within a certain radius from said working position and to deposit them at another location within the same radius in the form of a pile of logs stacked in parallel relationship to one another in any direction on the ground or in a vehicle.

In order to afford a better understanding of this invention and of the manner in which the same may be carried out in the practice, reference will now be made to the attached drawings forming part of this specification and illustrating diagrammatically by way of example a few typical embodiments of the invention. In the drawings:

Figure 8 shows in perspective the lower fork equipped for handling short logs and the like.

Figure 1:
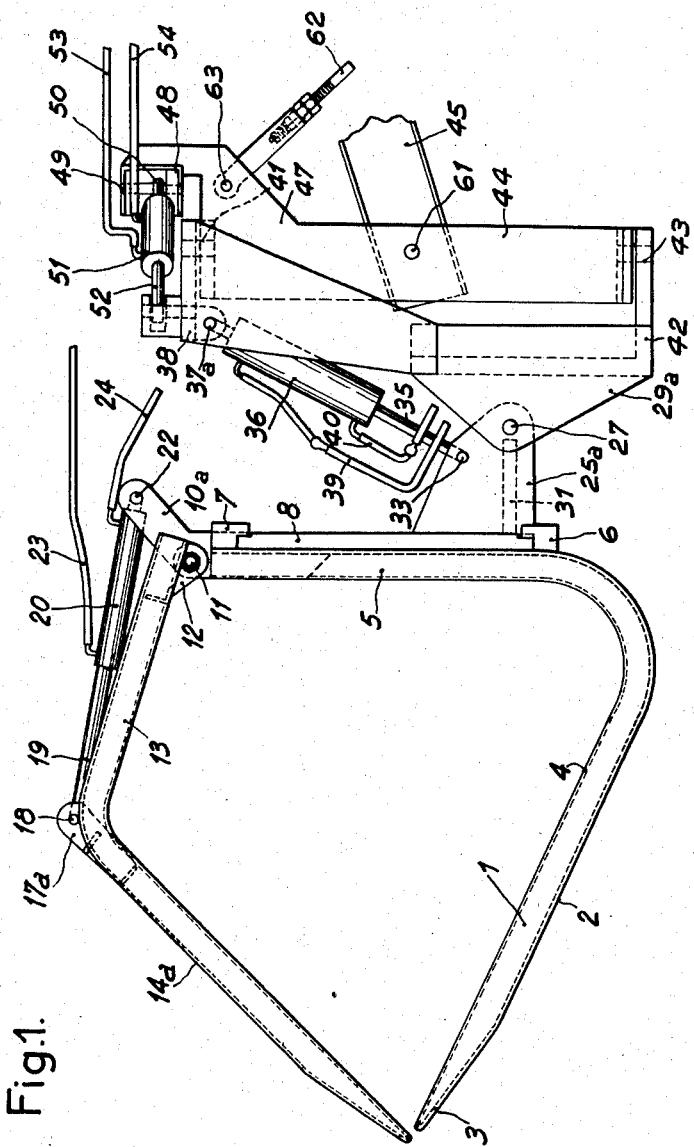
Figure 1 is a lateral view of the double fork assembly mounted at the upper end of the luffing boom of a slewing crane, with control means for actuating the various movable members.
Figure 2:
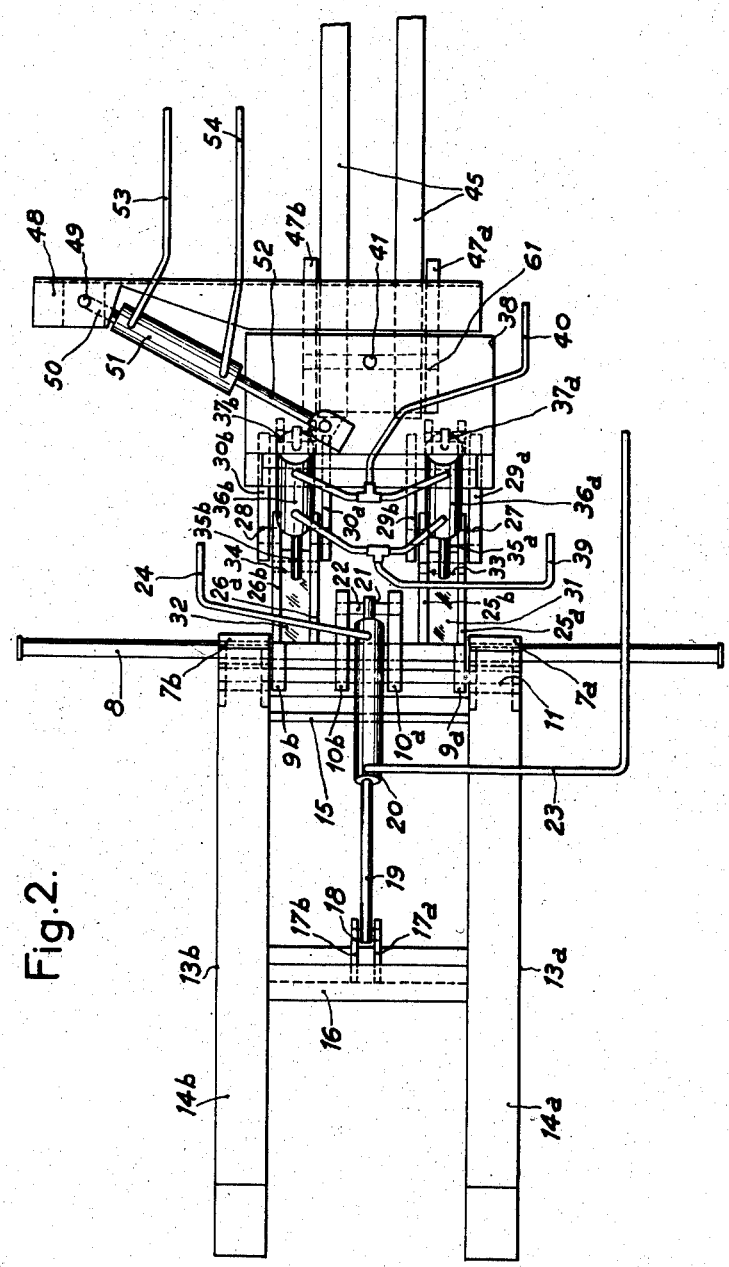
Figure 2 is a plane view of the double fork with its control means.

Referring now to the drawings and more particularly to Figs. 1 and 2, the apparatus according to this invention comprises a lower fork consisting of two prongs advantageously made of channel sections 1 having their flanges interconnected by a flat iron 2 welded thereon to form box-sectioned members.

At the prong ends the flanges of the channel sections 1 are tapered to constitute points 3; of course, the flat iron is also contained at these points and welded on the flanges of the channel sections.

The prongs are bent to a sharp or acute angle so that the sides 4 will support the small round logs whilst the sides 5 are secured at the top of the crane boom or jib. To this end, the sides 5 are provided with hooks 6, 7 rigid therewith and adapted to engage and slide along the longitudinal upper and lower edges of an apron-forming plate 8. As clearly shown in the drawings the longitudinal edges of this plate 8 are advantageously planed to a thickness just less than the inner aperture of the hooks 6, 7.

On either side of the vertical centre line of the plate 8 are welded or otherwise secured brackets 9a, 10a and 9b, 10b. All these brackets are formed with bores adapted to receive a shaft 11 for pivotally mounting the lugs 12 welded or otherwise secured on the flanges of the parallel channel sections 13 which are interconnected by flat irons 14a and 14b welded thereon to constitute the prongs of the upper fork. The prongs of this upper fork are interconnected in turn by angle irons 15, 16. On the angle iron 16 are secured a pair of lugs 17a, 17b constituting a strap or yoke receiving a pin 18 for pivotally attaching the rod 19 of a piston slidably fitted in a cylinder 20 carrying at its opposite end a lug 21 fulcrumed on a pivot pin 22 secured in the upper ends of the brackets 10a, 10b.

The cylinder 20 is provided at either end with a pipe connected to a tubing 23 or 24 for delivering fluid under pressure on one or the other face of the piston, according to the control action of the operator.

On the apron 8 are secured two groups of brackets 25a, 25b, and 26a, 26b on which are mounted pivot pins 27, 28 for the hinged mounting of corresponding straps rigid with the support. These straps consist in turn of brackets 29a, 29b on the one hand and 30a, 30b on the other hand.

The brackets 25a, 25b are connected through a brace member 31 and the brackets 26a, 26b are connected through a brace member 32. The straps 25a, 25b and 26a, 26b have pivoted thereon through pivot pins 33 and 34 the rods 35a, 35b of pistons slidably mounted in cylinders 36a, 36b pivoted in turn at 37a, 37b on the upper portion of the support at 38.

As already described, each end of cylinders 36a, 36b carries a pipe fed through a suitable tubing 39 or 40 with fluid under pressure controlled by the operator to feed one or the other face of the piston in the cylinders 36.

The upper portion 38 of the support is so designed as to be fulcrumed on a vertical pivot pin 41 and the lower portion 42 rigid with the upper portion 38 is adapted to be fulcrumed on a vertical pivot pin 43 in axial alignment with the pivot pin 41. The two pivots 41 and 43 are secured on the support 44 pivoted on the upper end 45 of the boom or jib 46 of the crane through a pivot pin 61 (Fig. 7) so that the pivot pins 41 and 43 remain vertical irrespective of the inclination of the boom or jib of the crane.

On brackets 47a, 47b rigid with the support 44 through which the assembly is mounted on the end portion of the boom there is secured a channel-sectioned member 48; between the flanges or wings of this member 48 a lug 50 rigid with one end of a cylinder 51 is hingedly mounted through a pivot pin 49, this cylinder 51 having slidably mounted therein a piston of which the rod 52 is pivoted on the upper portion 38 of the fork supporting member.

The cylinder 51 is provided at either end with pipes connected to suitable tubing sections 53, 54 for delivering fluid under pressure under the control of suitable means to one or the other side of the piston slidably fitted in the cylinder 51.

The boom 46 of the crane is pivoted at 55 (Fig. 7) on the frame structure of an automotive truck 56 having a seat 57 for the operator or driver, the arrangement comprising a steering wheel 58 and various controls for actuating the crane, for example a distributor 59 for controlling the delivery of fluid under pressure to the different cylinders 20, 36a, 36b and 51 through which the forks are actuated, and also to the cylinder 60 controlling the luffing motion of the boom.

To keep the pivot 41, 43 in a vertical position irrespective of the boom inclination, a point 63 of the supporting structure 44, 47 is connected through a rigid tie-rod or cable 62 to a point 64 of the frame structure of the crane.

These points 63, 64 overlie the horizontal pivots 61 and 55 so as to constitute a vertical kinematic parallelogram adapted to keep the axis of the pivot 41, 43 parallel to the vertical slewing axis of the crane jib.

Figure 6:
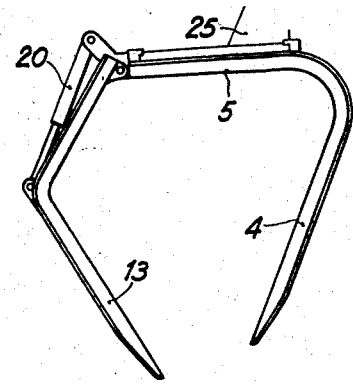
Figure 6 is another lateral view showing the open position of the forks just after the unloading thereof.
Figure 7:
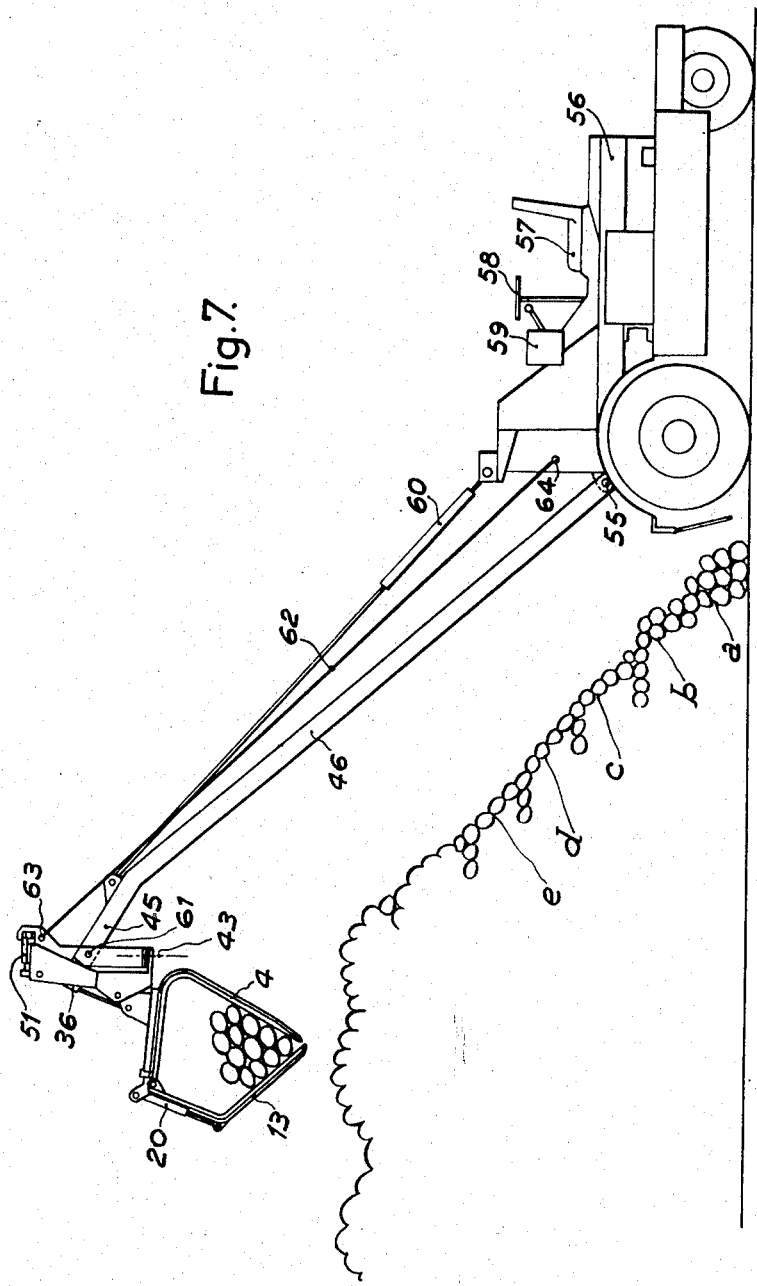
Figure 7 is a lateral view showing an automobile crane constructed according to this invention for diagrammatically illustrating the successive steps of a log unloading operation.

Figure 7 illustrates diagrammatically an automotive crane constructed in accordance with the teachings of this invention and located in front of a stack of small round logs. A load of logs is retained in the closed hinged forks of the jaw-forming unit. To drop the logs contained in these forks the operator actuates the proper control to enable the cylinders 36 to set the apron 8 in the inclined position illustrated in Figure 5; if the operator deems that the device is too high above the stack of logs he actuates the control to lower the boom 46. Then, the operator actuates the control whereby the piston in the cylinder 20 is moved in the proper direction to cause the jaws to open and assume the position indicated in Fig. 6. Under these conditions it is evident that the load previously held in the jaws will be deposited automatically upon the log stack, all the logs being substantially parallel.

When the stack of wood has attained a sufficient height the operator moves the crane bodily to the right, as seen in Fig. 7. By properly actuating the controls the operator will lay in succession the loads of the logs a, b, c, d, e, . . . These logs will place themselves according to their natural angle of repose.

Figure 8:
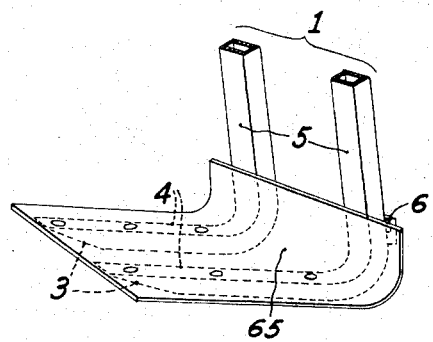

The crane constructed in accordance with the teachings of this invention operates satisfactorily for stocking or stacking round-sectioned logs of any size, and also for picking up from a stock thick logs of a length equal to or greater than six feet. For shorter logs or logs having a relatively small cross-section the picking-up from a stack is facilitated if the arms 4 of the forks are provided with a plate for converting the forks into a shovel. This arrangement is illustrated in Fig. 8 showing a sheet metal element 65 bolted on the two arms 4 of the lower fork 1 and extending from the level of hooks 6 to the points 3. This sheet metal element converts the fork into a shovel and may project on either side of the two arms of the fork, as shown in the drawing.

Figure 9:
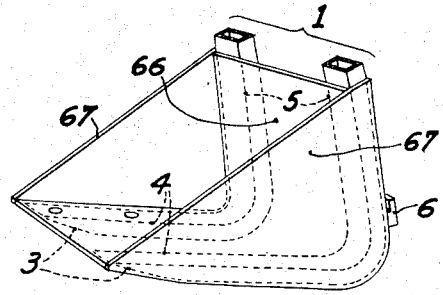
Figure 9 illustrates in the same manner the same fork equipped for transferring very short logs.

The picking up of very short logs (for example less than 40 in. in length) is also facilitated if two flanges are fitted on the shovel to convert same into a grab. This arrangement is illustrated in Fig. 9 showing a sheet metal element 66 similar to the sheet metal element 65 of the preceding embodiment which is bolted in the same manner on the two arms 4 of the fork. However, this sheet metal element is narrower and does not project from the outer sides of the arms 4. Moreover, a pair of flange-forming flat sheet metal members 67 are bolted on these outer sides and in this case the fork is converted into a bucket.

Figure 3:
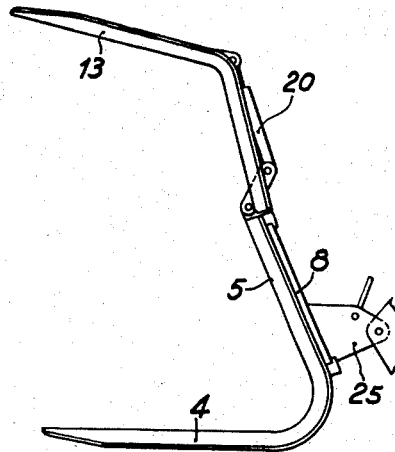
Figure 3 is a lateral view showing the forks in their open position for loading small logs.

Three main cases may be contemplated as regards the picking up of logs from a stack for loading trucks or the like:

If the logs are six feet long or more and have a relatively thick cross-section, the picking up is effected from the bottom by inserting the open fork thereunder, as illustrated in Fig. 3, while controlling the fall of the logs along their natural slope as the driver moves the crane backwards;

If the logs are from three to six feet in length with a correspondingly thinner section so as to be prone to place themselves askew when the slope is brought down or crumbling, the picking up is effected by converting the lower fork into a shovel as already stated, that is, by fitting a sheet-metal plate on the lower prongs, for example. The shovel is driven through the stack but in the direction opposite to the stacking direction, that is: . . . e, d, c, b, a.

Short logs, or logs of less than three feet in length are picked up by utilizing the grab consisting of the lower fork equipped with its bottom plate and two side flanges. This grab is inserted through the stack in the reverse order if compared with the stacking order, i. e. . . . e, d, c, b, a.

Figure 4:
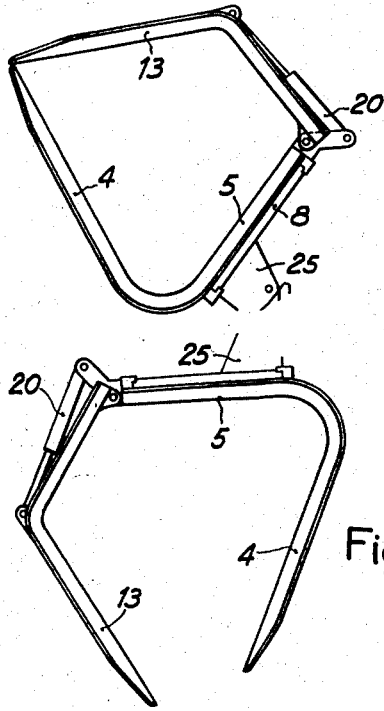
Figure 4 is another lateral view showing the same forks in their closed position during the transport of a load of small logs.
Figure 5:
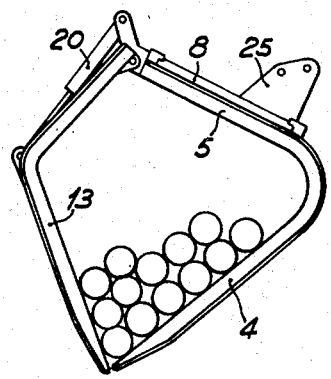
Figure 5 is a lateral view showing the inclined position of the forks just before they release or drop their load.

When the operator raises the boom 46 of the crane the jaw assumes substantially the position shown in Fig. 4 and the operator may subsequently slew the cane, actuate the luffing mechanism and rotate if necessary the support 38, 42 to lower the jaw above the truck or other vehicle in the position shown in Fig. 5, and finally open the jaw in the position of Fig. 6 so that the logs will fall into the vehicle to be loaded.

It will be readily understood that the forms, details, materials and various arrangements illustrated and described herein may vary without departing from the spirit and scope of the invention as set forth in the appended claims. Thus, the compressed-fluid control means illustrated may be replaced partially or completely by rope or cable controls actuated by electrically or otherwise powered winches or drums.

What we claim is:

1. A crane for transferring substantially cylindrical stacked logs from one stack to another, which comprises an automotive vehicle, a platform mounted for rotation on said vehicle about a vertical axis, a boom pivoted on said platform about a substantially horizontal luffing pivot, a supporting structure pivoted on the outer end of the boom about a pivot pin parallel to the axis of the luffing pivot of said boom, a support in front of and pivoted on said supporting structure about a vertical pivot pin, a first fork in front of and pivoted on said support about a horizontal pivot pin, another fork pivoted above said first fork about a pivot axis parallel to the pivot axis of said first fork, means adapted to maintain in a vertical position the pivot pin by which said support is pivoted on the supporting structure irrespective of the inclination of the boom relative to the vehicle, other means for controlling the pivotal movement of said support relative to said supporting structure, means for controlling the pivotal movement of first fork relative to said support, and means for controlling the pivotal movement of other fork relative to said first fork so as to open or close the jaw constituted by said first and other forks.

2. A crane according to claim 1, wherein the means for locking said support in the desired position relative to the supporting structure consist of a cylinder pivoted on said structure and provided with a piston slidably engaged in said cylinder, said piston having a rod pivoted on said support, and two pipes for delivering a fluid under pressure on either side of said piston, at will.

3. A crane according to claim 1, wherein said means for locking said first fork in the desired direction relative to the support consist of a cylinder pivoted on said support, a piston having a head slidably engaged in said cylinder and a rod pivoted on said first fork, and a pair of pipes for supplying a fluid under pressure on either side of said piston head, at will.

4. A crane according to claim 1, wherein said means for pivoting said other fork relative to said first fork consist of a cylinder pivoted on said first fork, a piston having a head slidably engaged in said cylinder and a rod pivoted on the other fork, and two pipes for delivering compressed fluid to said cylinder on either side of said piston head.

5. A crane as set forth in claim 1, wherein said first fork comprises an apron, brackets rigidly secured behind said apron and pivoted in front of said support about the horizontal axis of oscillation of said fork, two fork prongs each comprising a rectilinear rear portion, a pair of hooks rigidly secured behind said rectilinear rear portion and slidably engaged on either side of said apron to permit the adjustment at will of the spacing of said prong relative to the other prong and a front portion bent upwards to an acute angle relative to said rear portion, said bent front portion terminating with a pointed end ahead of said apron, and other brackets rigidly secured above said apron, said other fork consisting of another pair of prongs pivoted on said last mentioned brackets and rigidly inter-connected by at least one brace member.

6. A crane as set forth in claim 5, wherein said first fork comprises a sheet-metal, shovel-forming member bolted on said two prongs of the fork and extending from the level of said hooks up to the pointed ends of said prongs.

7. A crane as set forth in claim 5, wherein said first fork comprises a sheet-metal, shovel-forming member disposed between and bolted on said two prongs of the fork, said member extending from the level of said hooks up to the points of said prongs, and a pair of lateral sheet-metal bracing members bolted laterally on either side of said pair of forks and extending throughout the length of said forks.

8. A crane for transferring stacked cylindrical logs from one pile to another, which comprises a self-propelled vehicle, a platform mounted for swivel motion on said vehicle about a vertical axis, a boom pivoted on said platform for luffing movement about a horizontal pivot axis, a frame pivoted on the boom end about an axis parallel to the luffing axis of oscillation of said boom, a connecting member having one end secured on said platform above said horizontal pivot axis of said boom and another end secured on said frame above said pivot axis of said frame to counteract any tendency of said frame to tilt forwards, the distance between said two ends being equal to the distance between said two points of oscillation and said connecting member being parallel to the line of said two points of oscillation, thereby keeping said frame in a fixed direction relative to the vertical independently of the position of said boom, a support in front of said frame and pivoted thereon about a vertical axis of oscillation, a fork pivoted in front of said support about a horizontal axis of oscillation, another fork pivoted above said first fork about an axis of oscillation parallel to the pivot axis of said first fork, means for controlling the pivoting movement of said support relative to said frame, means for controlling the pivoting movement of said first fork relative to said support and other means for controlling the pivoting movement of said second fork relative to said first fork for opening or closing the jaws formed by said two forks.

References Cited in the file of this patent

UNITED STATES PATENTS

| | | |
|---|---|---|
| 1,884,907 | Stoner | Oct. 25, 1932 |
| 2,418,251 | Drott | Apr. 1, 1947 |
| 2,445,076 | Munson | July 13, 1948 |
| 2,488,767 | Drott et al. | Nov. 22, 1949 |
| 2,646,182 | Maas | July 21, 1953 |
| 2,776,768 | Carlsen | June 8, 1957 |
| 2,804,221 | Kennedy | Aug. 27, 1957 |